US007829636B2

(12) United States Patent
Shaghaghi et al.

(10) Patent No.: US 7,829,636 B2
(45) Date of Patent: Nov. 9, 2010

(54) POLYMERS FOR BITUMEN MODIFICATION & OTHER USES

(76) Inventors: Sara Shaghaghi, Iran Polymer & Petrochemical Institute. P.O. Box: 14965/115., Tehran (IR); Reza Shaghaghi, Møllemarksvej 64, St. Th., Odense 5200 (DK)

( * ) Notice: Subject to any disclaimer, the term of this patent is extended or adjusted under 35 U.S.C. 154(b) by 0 days.

(21) Appl. No.: 11/895,626

(22) Filed: Aug. 27, 2007

(65) Prior Publication Data
US 2008/0058470 A1    Mar. 6, 2008

Related U.S. Application Data

(60) Provisional application No. 60/840,853, filed on Aug. 29, 2006.

(51) Int. Cl.
*C08F 20/08* (2006.01)
(52) U.S. Cl. ............... 525/327.4; 525/67; 525/68; 525/163; 525/207; 525/285; 526/232.1; 526/203; 524/59; 524/60; 524/577
(58) Field of Classification Search ............. 525/327.4, 525/68, 67, 163, 207, 285; 526/232.1, 203; 524/59, 60, 577
See application file for complete search history.

(56) References Cited

U.S. PATENT DOCUMENTS

| | | | | |
|---|---|---|---|---|
| 3,897,209 | A * | 7/1975 | Harris et al. ................... 422/17 |
| 4,011,184 | A * | 3/1977 | van Reijendam et al. ....... 525/98 |
| 4,262,097 | A * | 4/1981 | Dawans et al. ............... 525/274 |
| 4,450,261 | A * | 5/1984 | Chiao et al. ................. 526/214 |
| 4,742,116 | A * | 5/1988 | Schepers et al. ............... 525/74 |
| 5,069,681 | A * | 12/1991 | Bouwknegt et al. ............ 8/442 |
| 5,126,404 | A * | 6/1992 | Eckel et al. .................... 525/67 |
| 5,442,041 | A * | 8/1995 | Mallikarjun et al. ......... 528/483 |
| 2004/0068807 | A1* | 4/2004 | Fan et al. ....................... 8/509 |

FOREIGN PATENT DOCUMENTS

WO    WO 2004033547 A2 *    4/2004

OTHER PUBLICATIONS

Saelao et al. J. Appl. Polym. Sci. 2005, 95, 28-38.*
Kolesnikov et al. Russian Chemical Reviews 1962, 31, 485-496.*
Shaghaghi et al. Journal of Polymer Research 2006, 13, 413-419.*

* cited by examiner

*Primary Examiner*—Vasu Jagannathan
*Assistant Examiner*—Mark S Kaucher
(74) *Attorney, Agent, or Firm*—Barry Choobin; Chobin & Chobin Consultancy LLC

(57) ABSTRACT

The embodiments herein relate to a method of synthesizing new improved reactive terpolymer, S-MMA-X (styrene/modified maleic anhydride/X) wherein X is any type of polymers. The method involves synthesizing styrene-modified maleic anhydride complex (SMMA) with the ability to react with all kinds of polymers to produce new reactive terpolymer with formation of nano particles inside them. The nanoparticle formations improve the physio-chemical, thermal and mechanical properties of the newly formed reactive terpolymer when compared to natural rubber, their derivatives, EPDM or other known polymer etc. Depending on the property of the end product polymers produced by the invention, the end use can be varied. In one embodiment, the polymer X is natural rubber (NR) and the end product terpolymer is used as bitumen modifier. In another embodiment, the polymer X is ethylene-propylene diene monomer (EPDM) and the end product terpolymer behaves like a smart particle and absorbs oil and water contaminants.

5 Claims, 19 Drawing Sheets

Schematic representation of reaction between styrene- modified maleic anhydride complex and natural rubber.

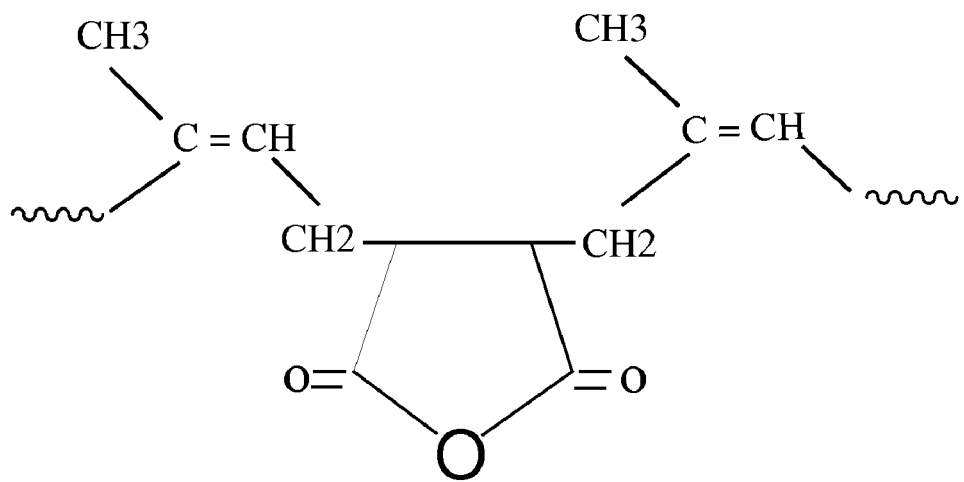
Figure 1. Schematic of chemical structure which is susceptible to crosslink.

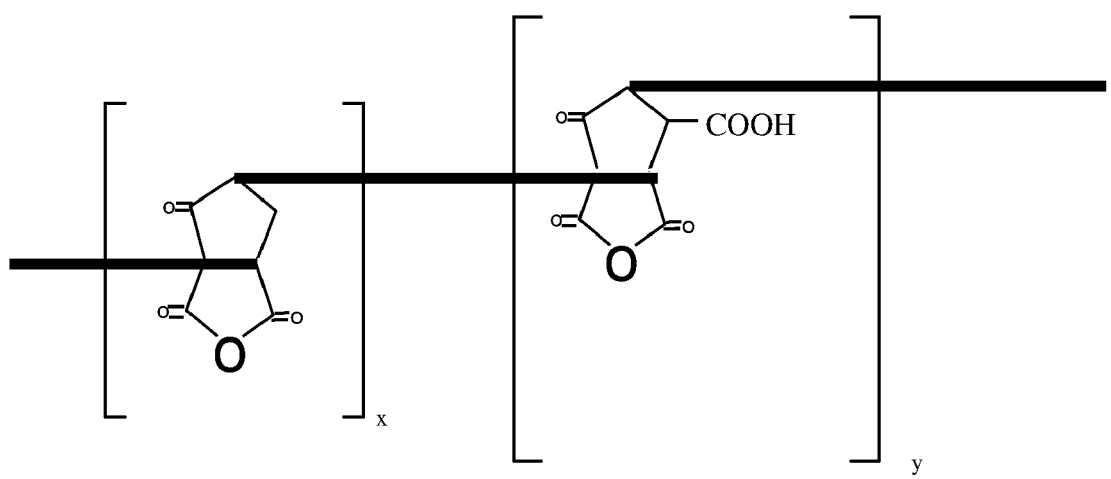
Figure 2. Chemical structure of cyclopentanone

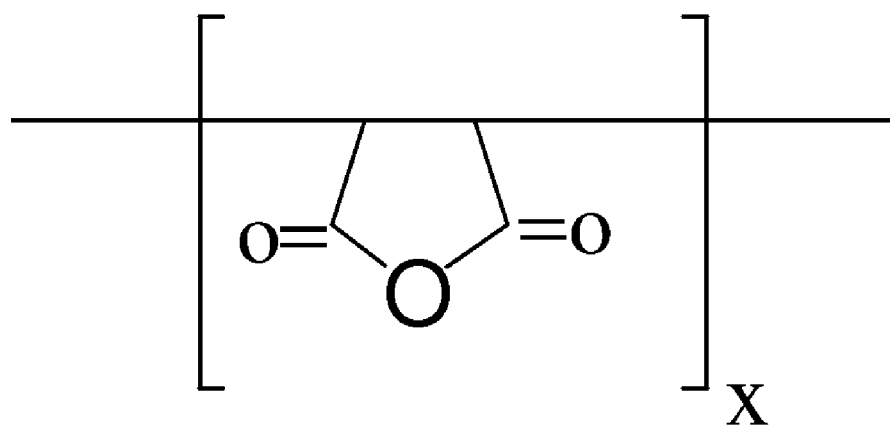
Figure 3. Chemical structure of poly maleic anhydride.

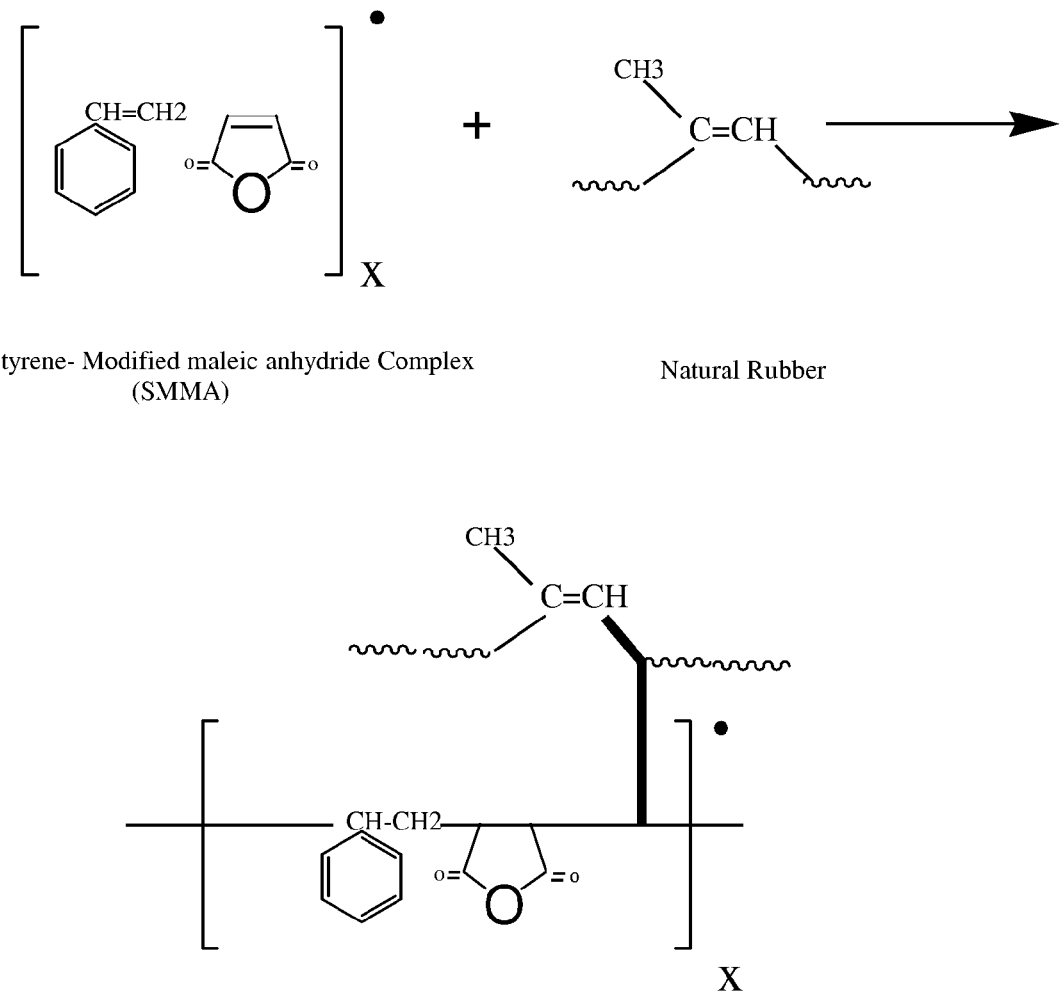
Figure 4. Schematic representation of reaction between styrene- modified maleic anhydride complex and natural rubber.

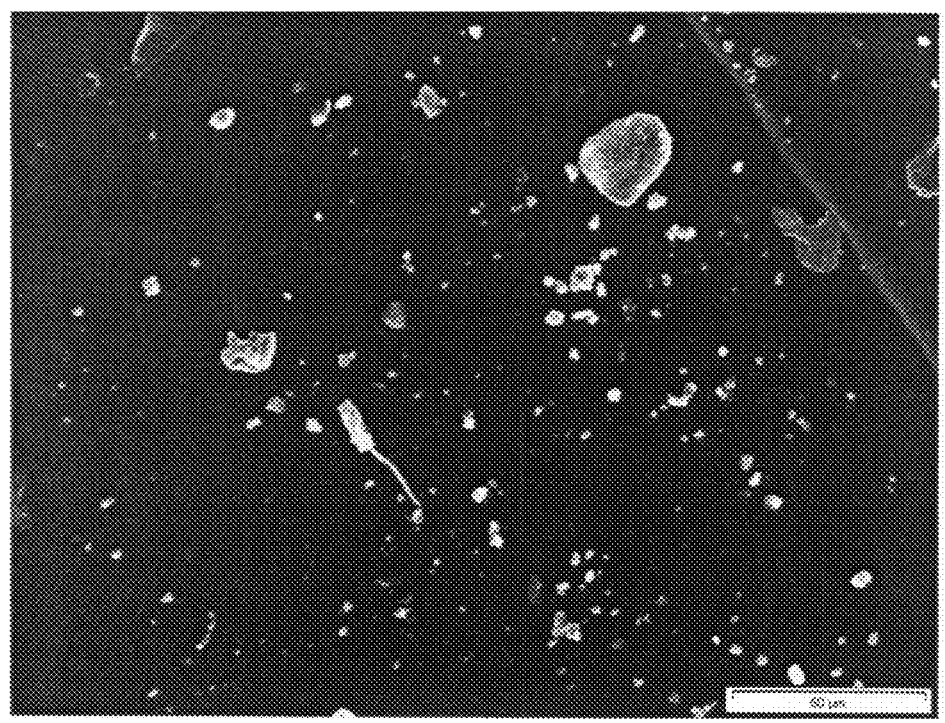
Figure 5. TEM of nano particle's distribution (SMMA copolymers) through natural rubber.

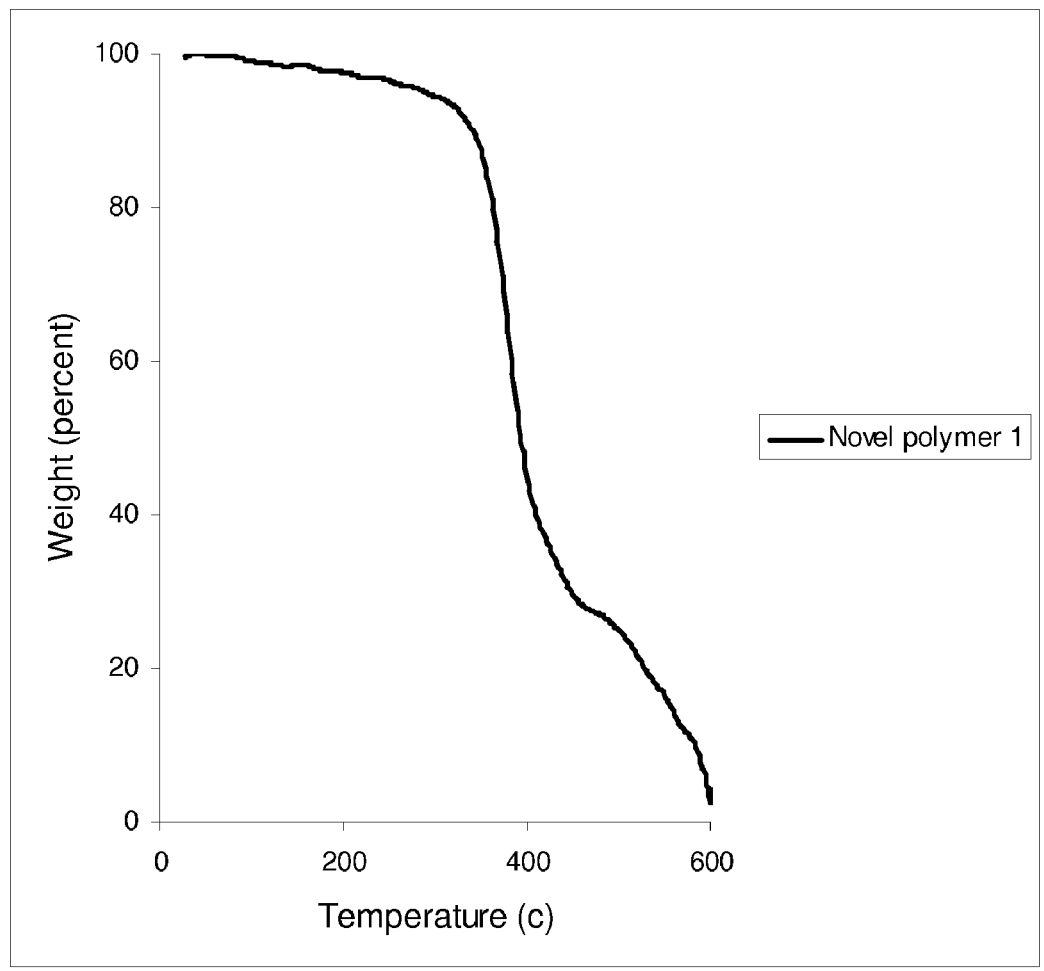
Figure 6. TGA thermogram of the novel polymer 1.

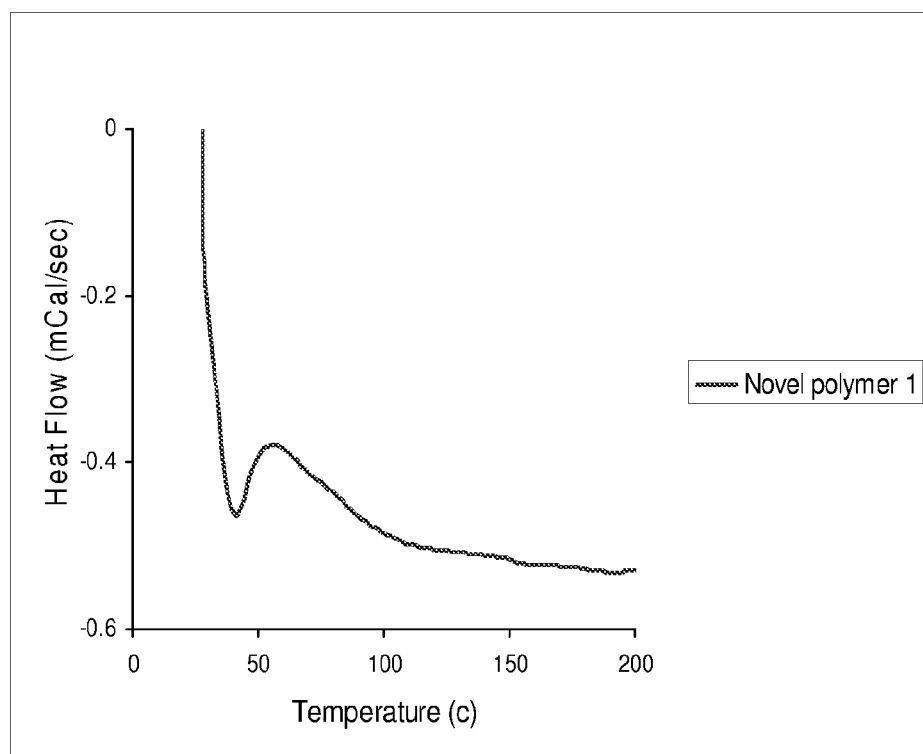
Figure 7. DSC of the novel polymer 1, in temperature range of zero to 200 °C.

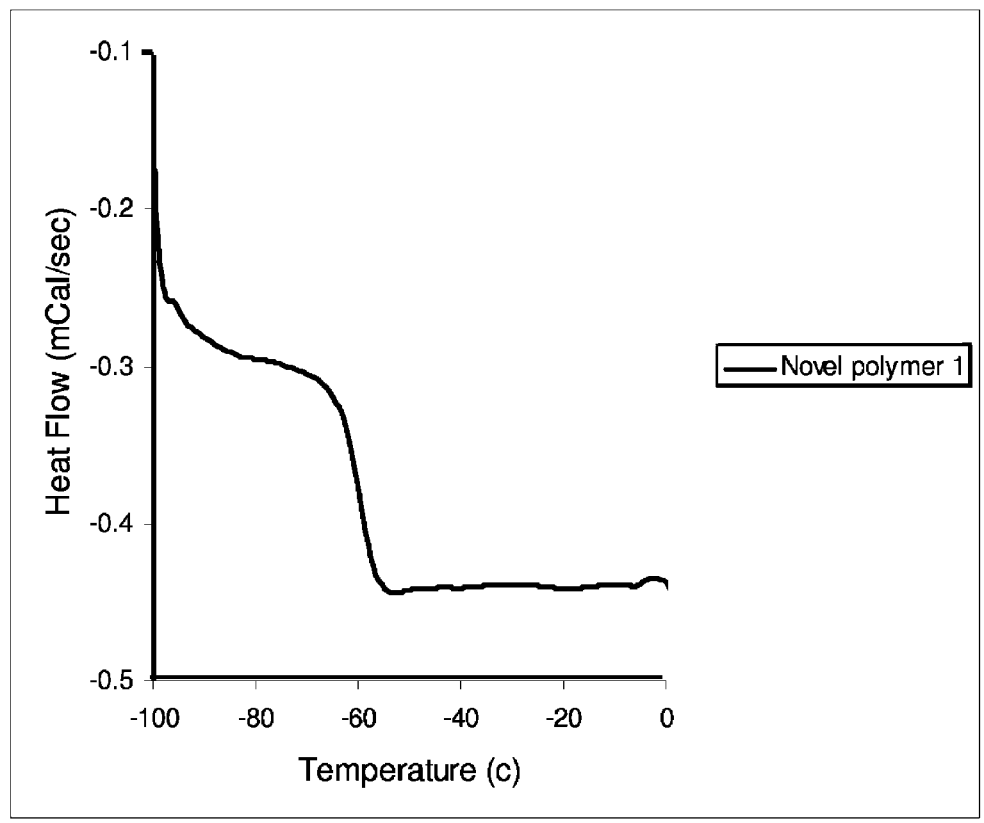
Figure 8. DSC of the novel polymer 1, in temperature range of – 100 to zero °C.

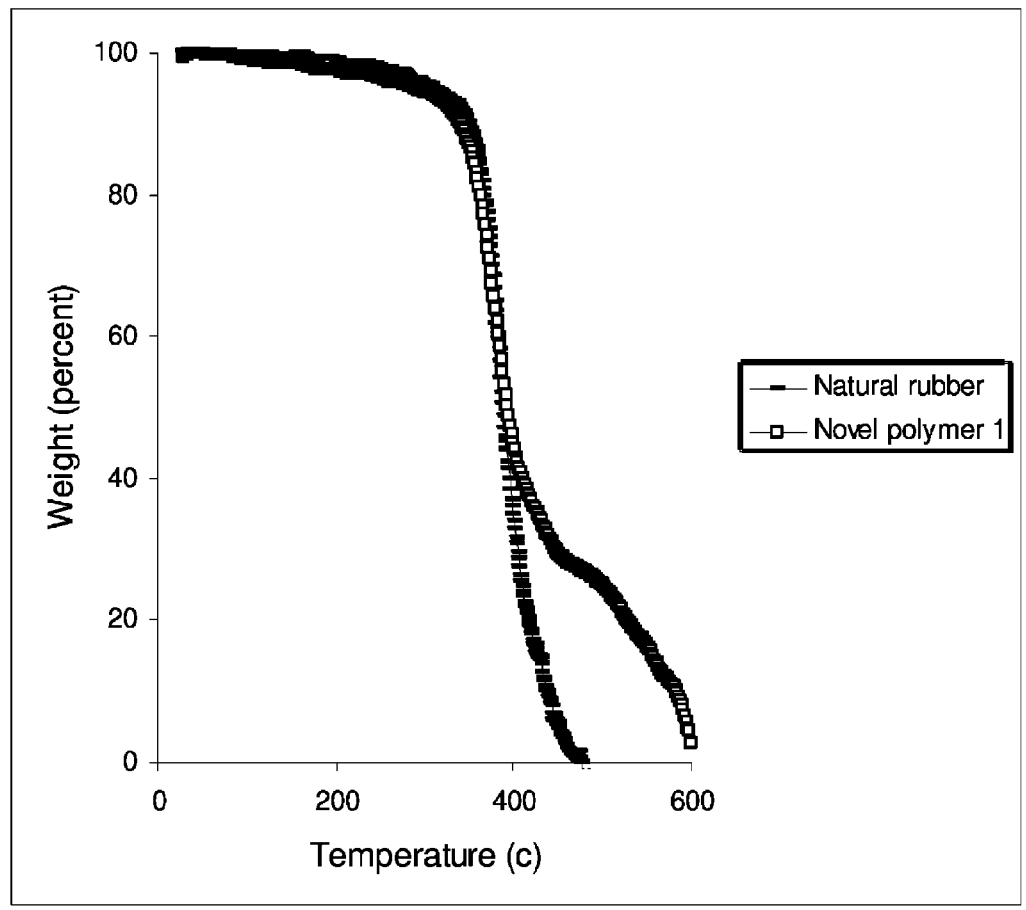
Figure 9. TGA thermogram of the novel polymer 1 & pure natural rubber.

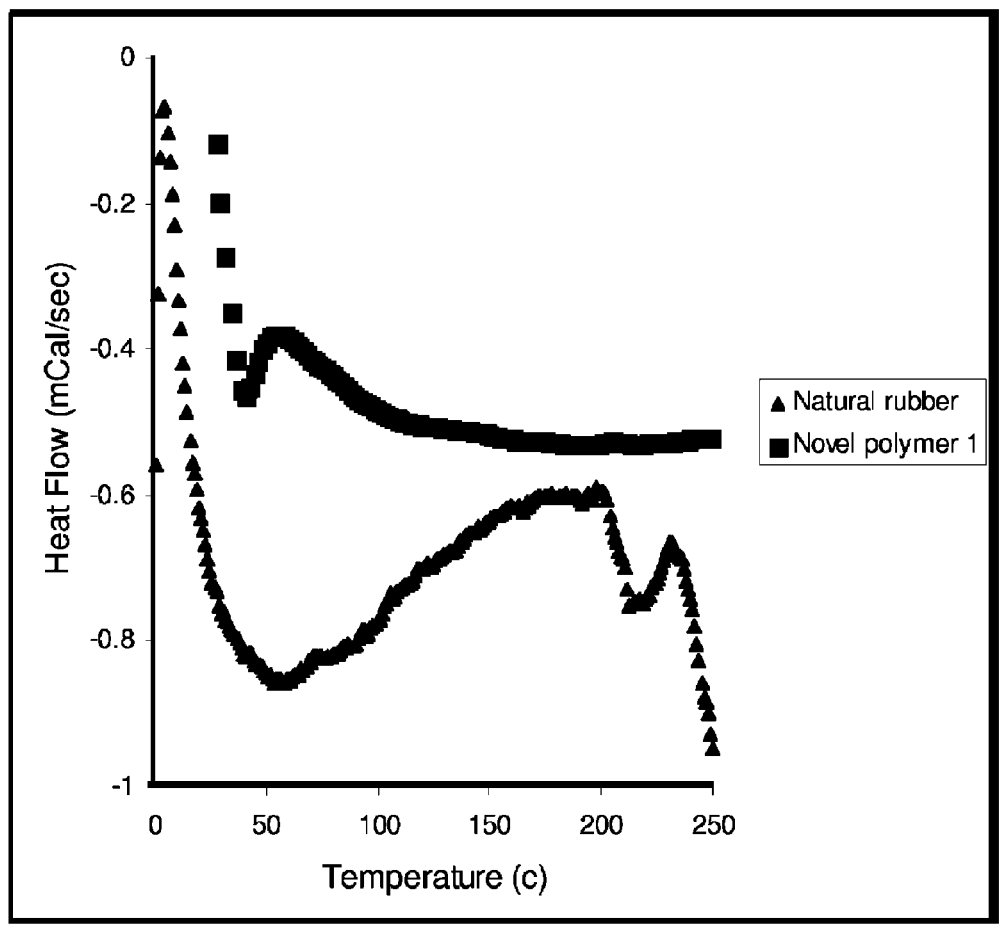
Figure 10. DSC of the novel polymer 1 & pure natural rubber, in temperature range of zero to 200 °C

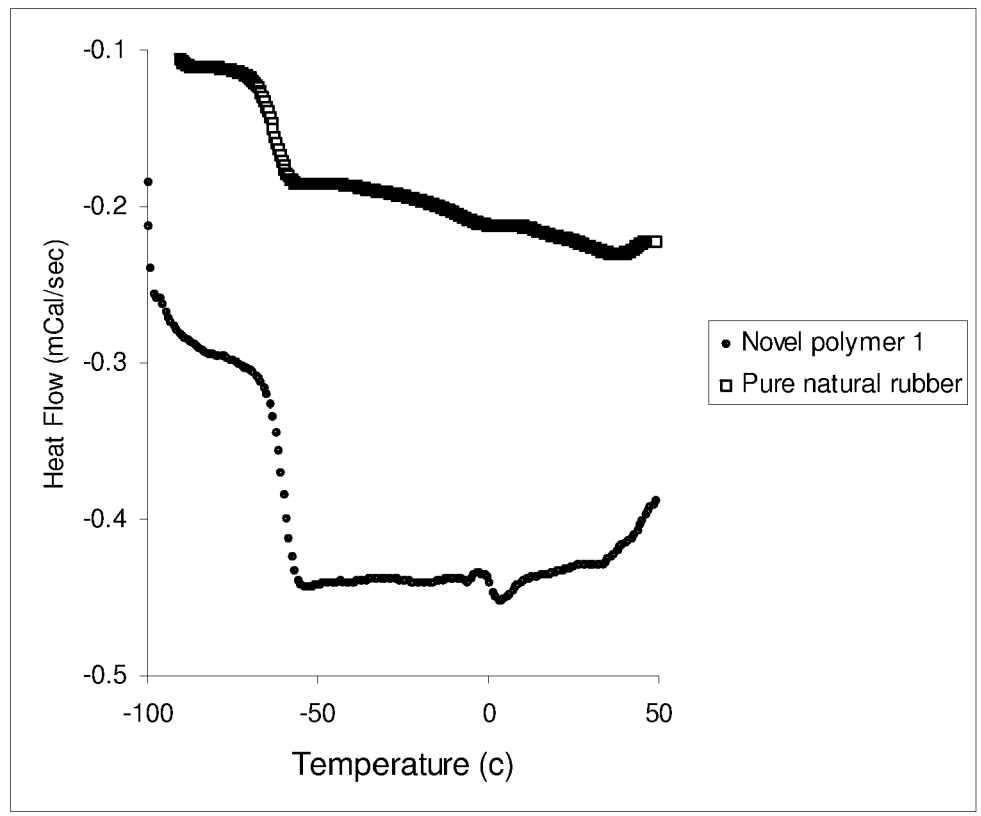
Figure 11. DSC of the novel polymer 1 & pure natural rubber, in temperature range of -100 to 50 °C.

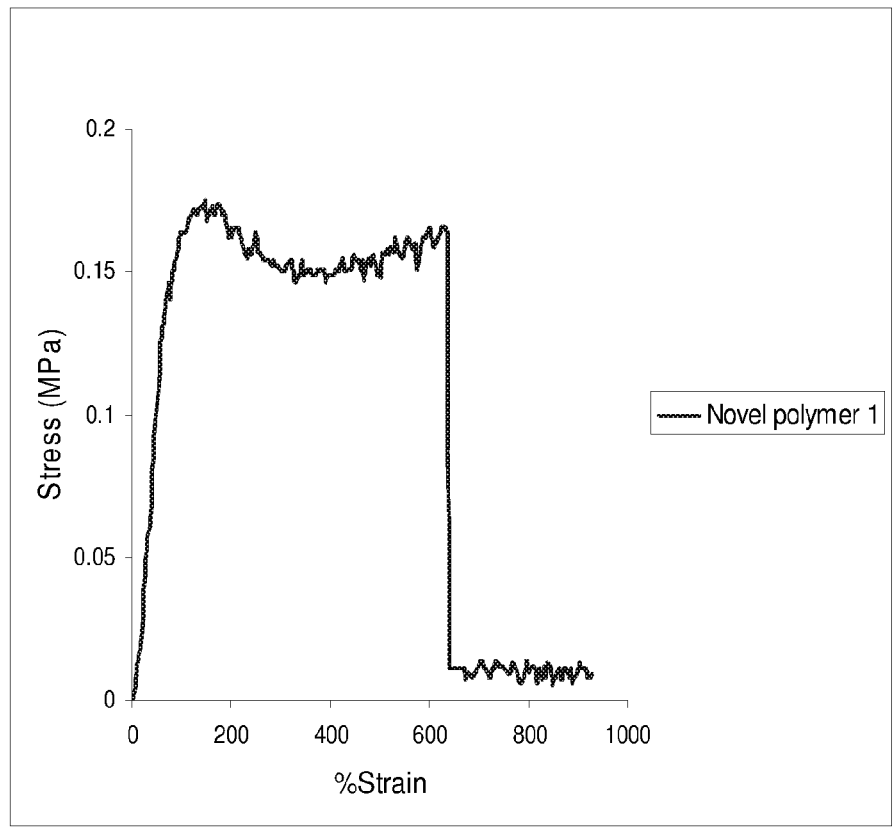
Figure 12. Stress (MPa) vs strain (%) of the novel polymer 1, at test speed of 50 mm/min.

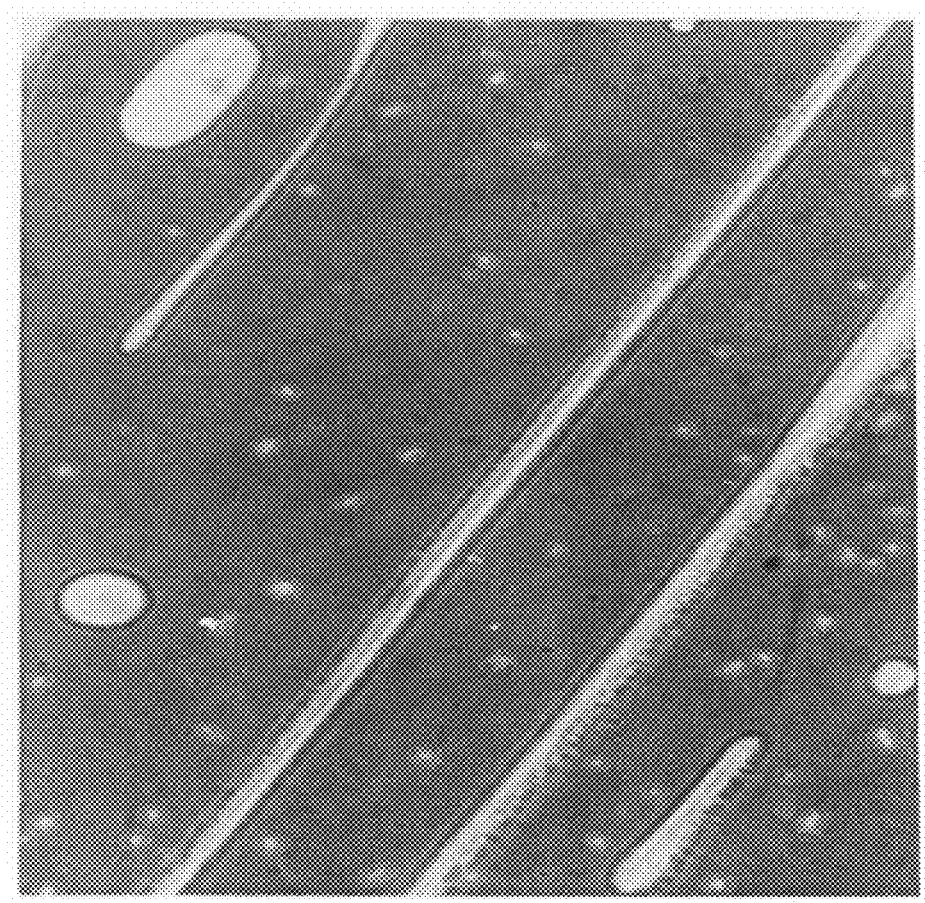
Figure 13. Photograph of mixture of bitumen & novel polymer 1.

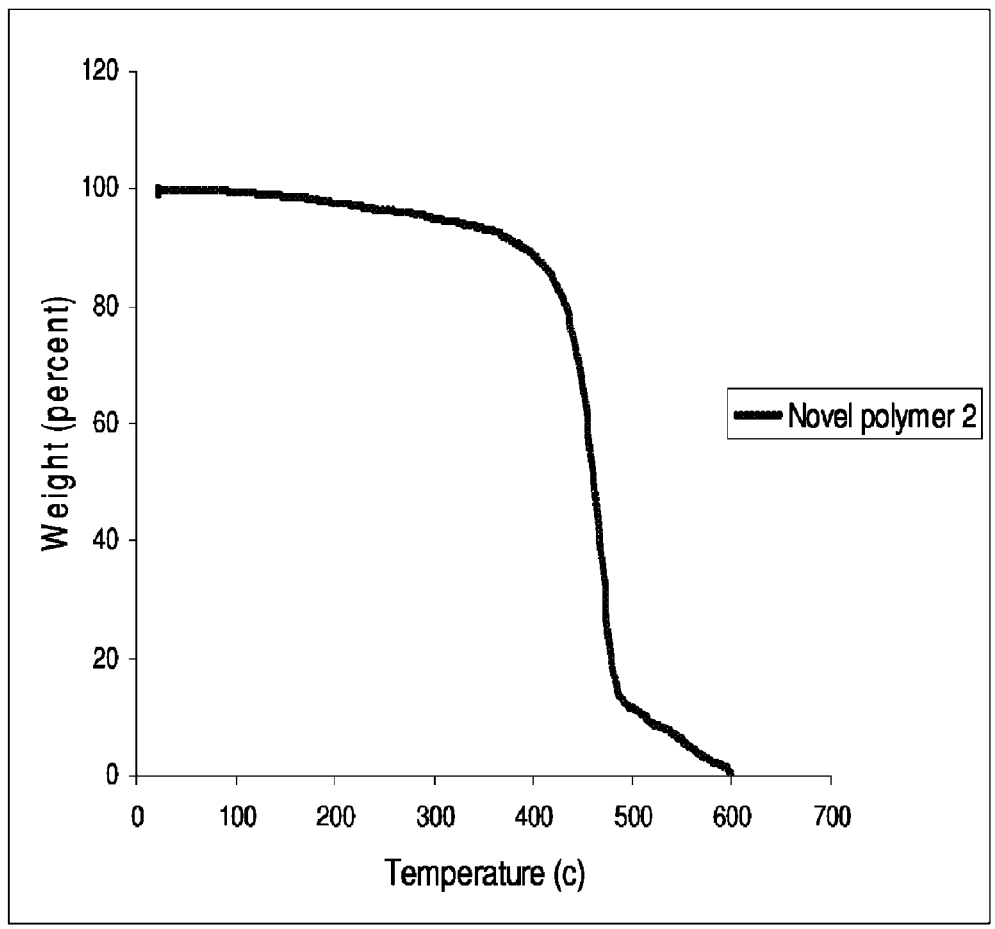
Figure 14. TGA of the novel polymer 2.

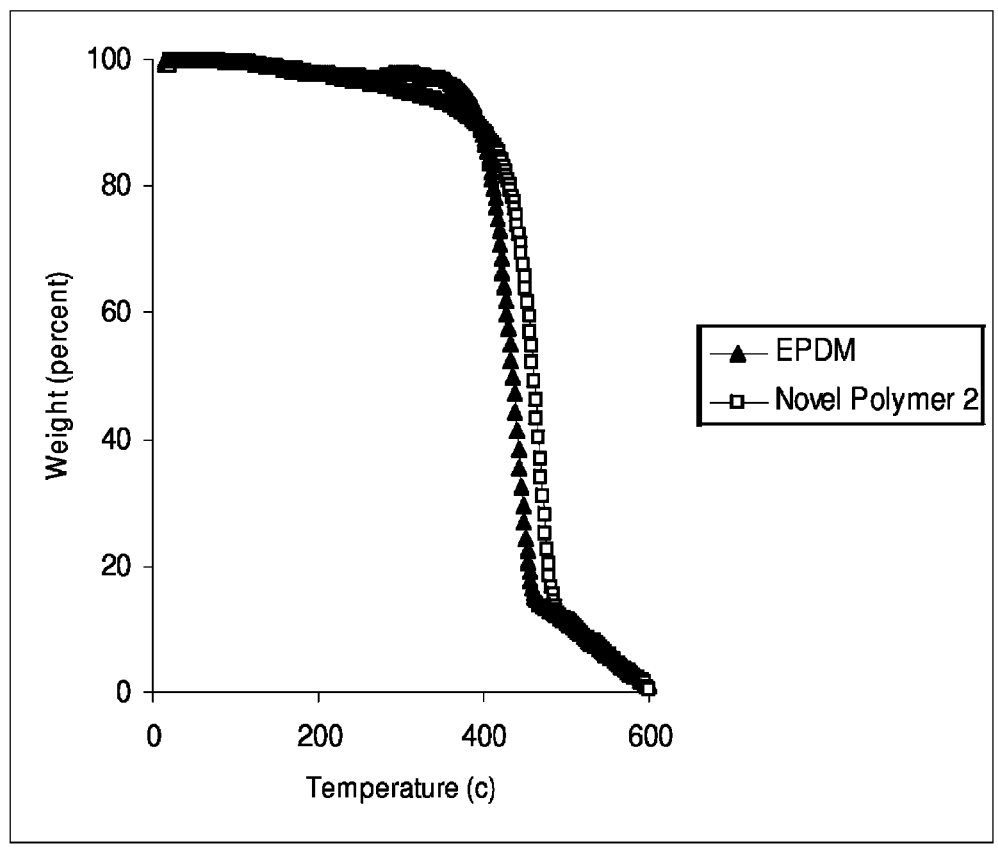
Figure 15. TGA of the novel polymer 2 & pure EPDM

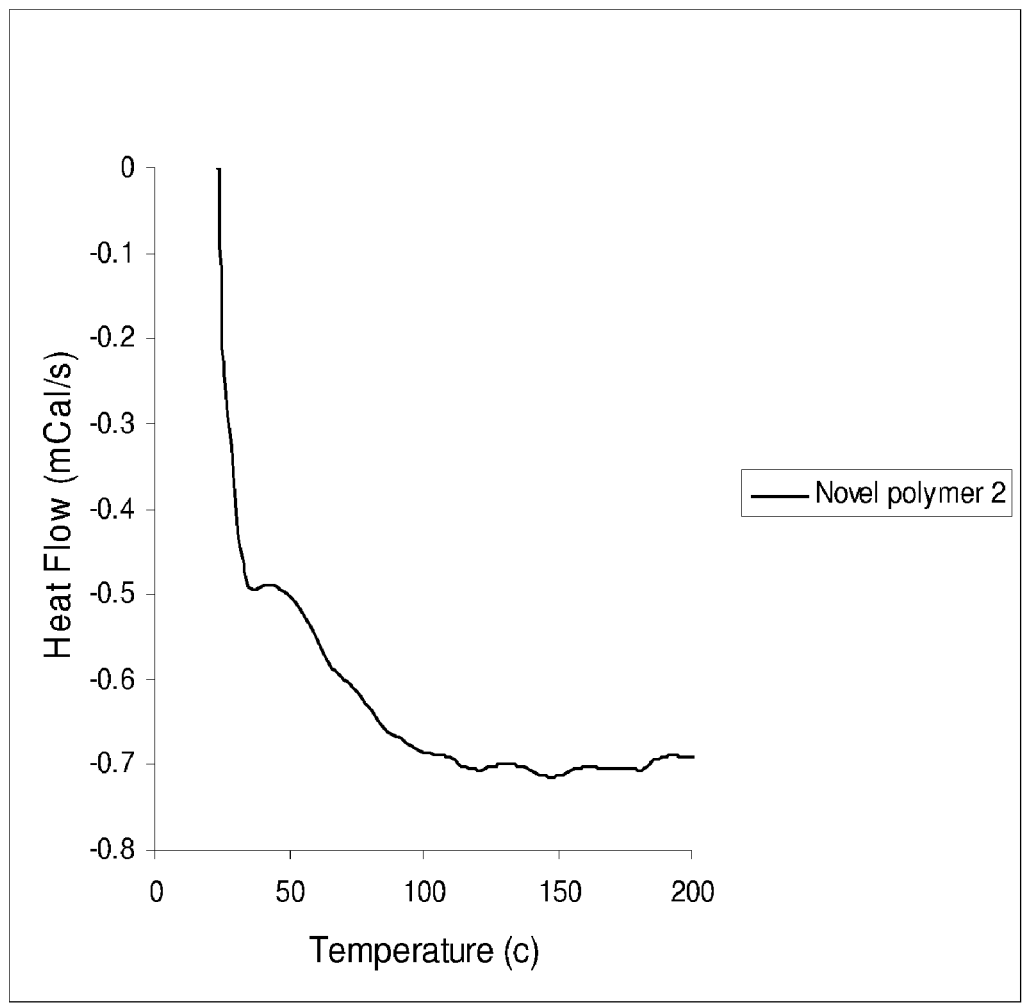
Figure 16. DSC of the novel polymer 2, in temperature range of zero to 200 °C.

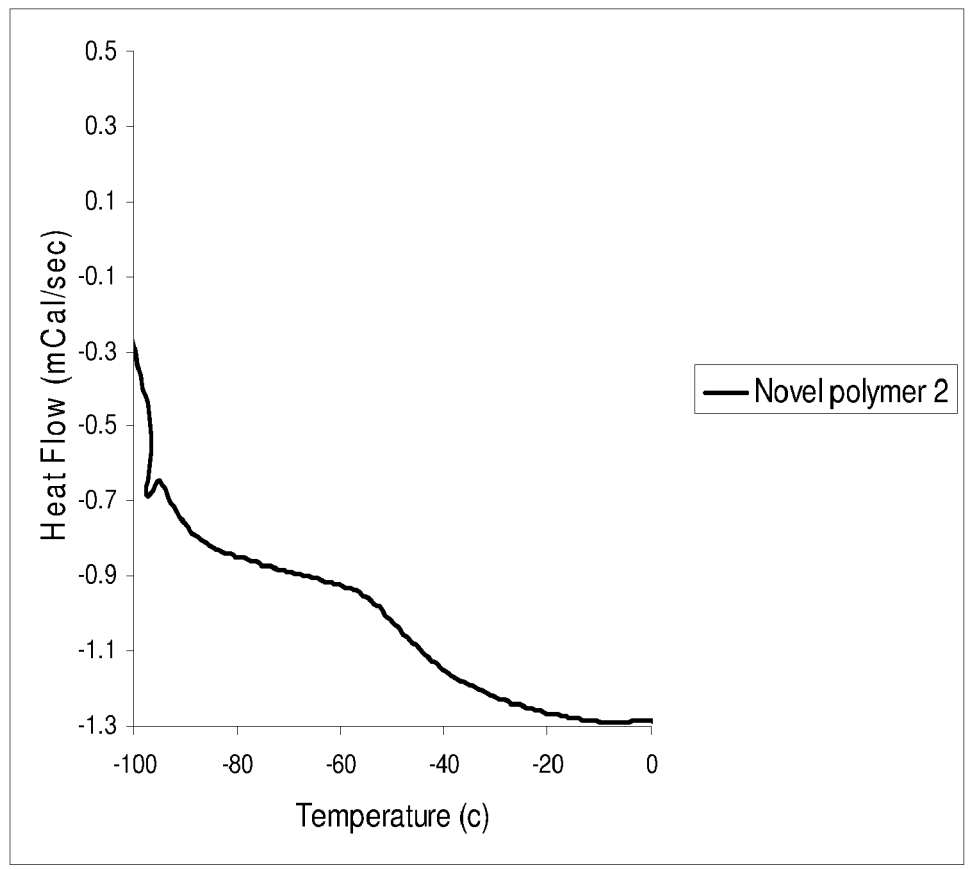
Figure 17. DSC of the novel polymer 2, in temperature range of – 100 to zero °C.

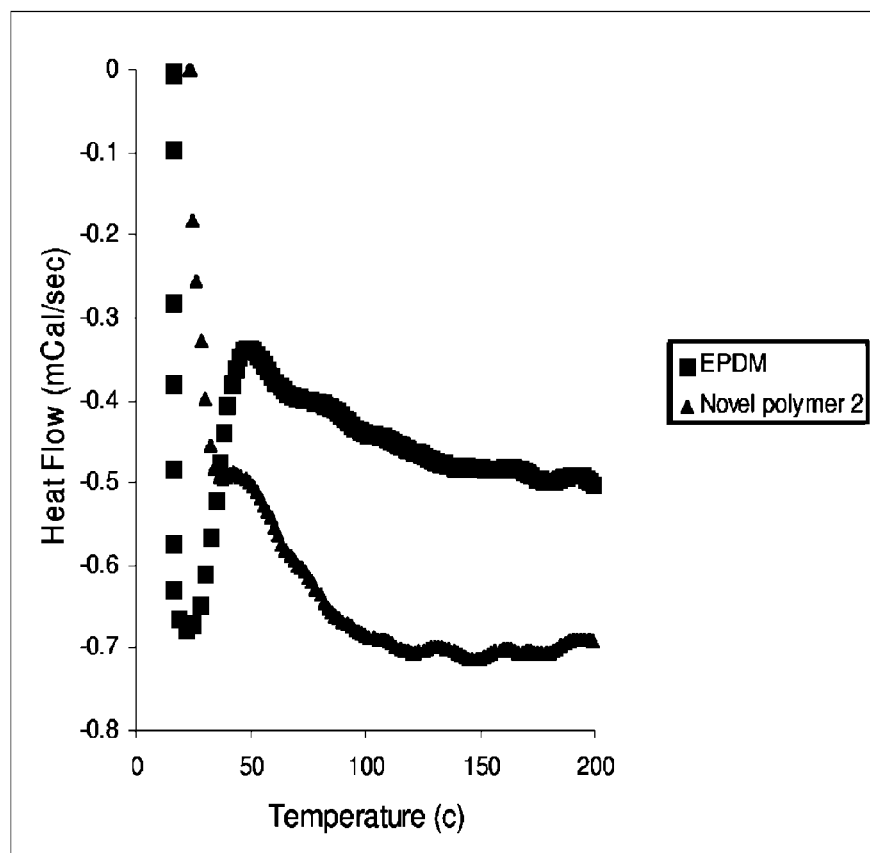
Figure 18. DSC of the novel polymer 2 & pure EPDM, in temperature range of zero to 200 °C.

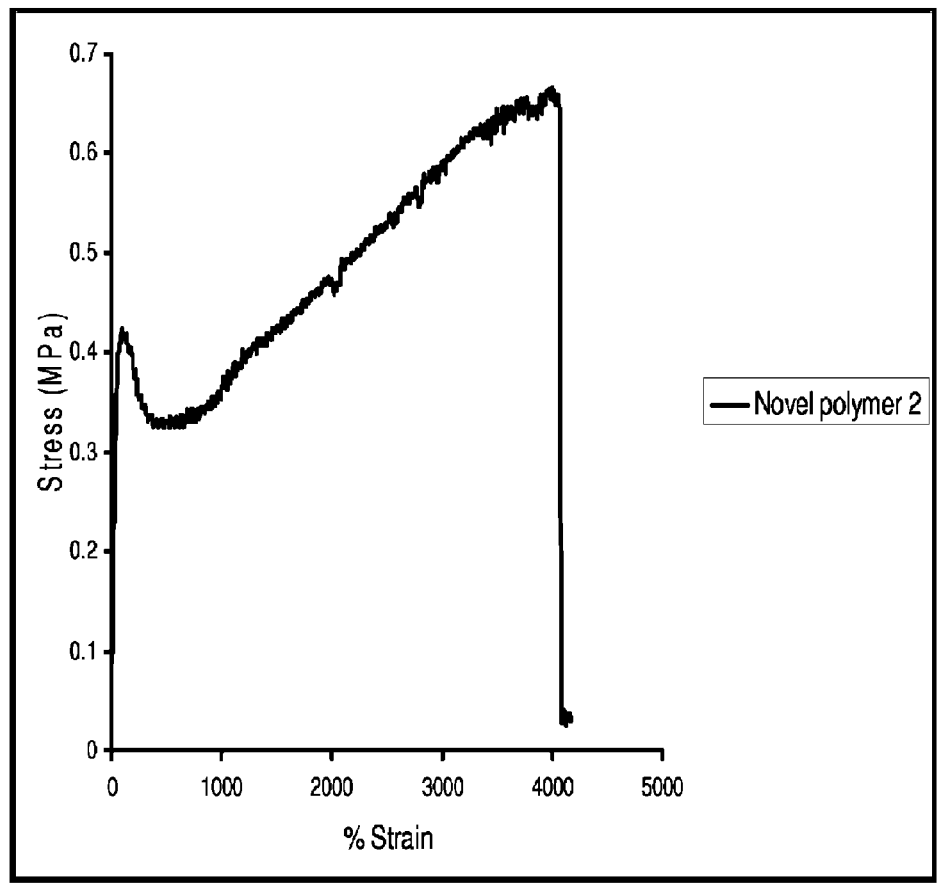
Figure 19. Stress (MPa) vs strain (%) of the novel polymer 2, at test speed of 50 mm/min.

POLYMERS FOR BITUMEN MODIFICATION & OTHER USES

BACKGROUND OF THE INVENTION

1. Field of the Invention

Present invention relates to the field of polymer chemistry in general, while, in particular it relates to manufacture of terpolymer having enhanced physical and mechanical properties due to changes in the newly produced terpolymer.

2. Description of Related Art

Until now, the main groups of polymers which have been used as bitumen modifiers in the prior art includes, thermosetting polymers, thermoplastic polymers, natural (NR) & synthetic rubbers, thermoplastic elastomer (TPE) and Evaloy® (RET). Each of the above groups has disadvantages which cannot be called as ideal one, for example: thermoplastic polymers are characterized by softening on heating and hardening on cooling. Polyethylene (PE), atactic and isotactic polypropylene (APP, IPP), polyvinylchloride (PVC), polystyrene (PS), . . . , etc, are the main polymers of this group. Thermoplastic polymers associate at room temperature with bitumen, increasing its viscosity; however they do not significantly confer any element of elastic deformation to bitumen and can separate when heated. Thermosetting polymers are not widely used, due to the high cost and special method of application.

Natural rubber (NR) and synthetic rubbers such as polybutadiene, styrene-butadiene rubber (SBR), etc, are sensitive to decomposition and oxygen absorption. They have a molecular weight too high to be directly dissolved in the bitumen and must be partially decomposed and mechanically homogenized.

Thermoplastic elastomers (TPE) such as Styrene-butadiene-styrene (SBS) and Styrene-Isoprene-Styrene (SIS) are physically dispersed in bitumen, but do not chemically react with the bitumen. Keeping a consistent dispersion often requires extra care and attention; this can be especially difficult if there is any delay in using of the material. Also the butadiene mid block in SBS is unsaturated which means it will oxidize in the pavement. Elvaloy® (RET) (DuPont) is a random terpolymer comprising ethylene, normal butyl acrylate and glycidyl methacrylate (GMA). GMA copolymers chemically react with asphalt to form a polymer linked-asphalt system. Elvaloy (RET) can only be used for asphalt (not bitumen alone) which means it has no mechanical strength by itself. Thus, a need exist for new bitumen modifier which avoid the above disadvantages.

SUMMARY OF THE INVENTION

Briefly, the present invention is to synthesize new reactive terpolymers by reacting styrene-modified maleic anhydride complex (SMMA) with all types of polymers. Maleic anhydride reacts with free radical generating polymerization catalyst, i.e. benzoyl peroxide in a suitable solvent to forms compound with an active ingredient, which is called as modified maleic anhydride (MMA) in the context of the present invention. The styrene monomer forms a complex Styrene modified maleic anhydride (SMMA) with the MMA when mixed with it at room temperature for one hour. By incremental addition of this complex to all types of polymers, i.e. Natural rubber (NR), two reactions happen, first some SMMA reacts chemically with functional groups present in the NR, so viscosity of solution decreases, and second some of the SMMA form new copolymer of styrene-modified maleic anhydride and disperses through polymer in nano size.

LEGENDS OF THE FIGURES

FIG. 1 illustrates a chemical structure which is susceptible to crosslink.

FIG. 2 Depicts chemical structure of cyclopentanone.

FIG. 3 Depicts Chemical structure of poly maleic anhydride.

FIG. 4 Schematic representation of chemical reaction between styrene-modified maleic anhydride complex and natural rubber.

FIG. 5 Transition Electron Microscopy (TEM) picture of novel reactive polymer produced by present invention showing the formation of nanoparticles distribution.

FIG. 6 illustrates a thermogram of novel polymer 1 produced from Thermal Gravimetry Analysis (TGA), showing the weight loss of novel polymer 1 against temperature.

FIG. 7 depicts the melting point of novel polymer 1 using Differential Scanning Calorimetry (DSC) in temperature range of 0° C. to 200° C.

FIG. 8 depicts the glass transition temperature for novel polymer 1 using Differential Scanning Calorimetry (DSC) in temperature range of −100° C. to 0° C.

FIG. 9 shows the result of Thermal Gravimetry Analysis (TGA) of the novel polymer 1 & pure natural rubber, thermogram clearly shows novel polymer 1 as better thermal stability compared to pure natural rubber.

FIG. 10 depicts the results of Differential Scanning Calorimetry (DSC) of the novel polymer 1 & pure natural rubber, in temperature range of 0° C. to 250° C.

FIG. 11 illustrators the results from Differential Scanning Calorimetry (DSC) studies of the novel polymer 1 & pure natural rubber, in temperature range of −100° C. to +50° C.

FIG. 12 depicts the Stress (MPa) vs. strain (%) curve of the novel polymer 1, at test speed of 50 mm/min.

FIG. 13 shows a Photograph of mixture of the novel polymer 1 with the bitumen.

FIG. 14 shows a thermogram of novel polymer 2 produced from Thermal Gravimetry Analysis (TGA), showing the weight loss of novel polymer 2 against temperature.

FIG. 15 shows the result of Thermal Gravimetry Analysis (TGA) of the novel polymer 2 & pure Ethylene-propylene-diene monomere (EPDM).

FIG. 16 depicts the melting point of novel polymer 2 using Differential Scanning Calorimetry (DSC) in temperature range of 0° C. to 200° C.

FIG. 17 depicts the glass transition temperature for novel polymer 2 using Differential Scanning Calorimetry (DSC) in temperature range of −100° C. to 0° C.

FIG. 18 depicts the results of Differential Scanning Calorimetry (DSC) of the novel polymer 2 & EPDM rubber, in temperature range of 0° C. to 200° C.

FIG. 19 illustrates the stress (MPa) vs. strain (%) curve of the novel polymer 2, at test speed of 50 mm/min.

DESCRIPTION OF THE PREFERRED EMBODIMENTS

New improved polymers which are synthesized by the method of present invention are reactive terpolymers with the chemical designation of SMMAX (styrene/modified maleic anhydride/X), where X, can be all type of polymers (natural rubber (NR), synthetic rubbers, crumb rubber, thermoplastic elastomers (TPE), thermoplastics, elvaloy (RET) and a combination of different or the same type of polymers) or styrene-modified maleic anhydride copolymer by itself can also be used for bitumen modification in some cases. These newly produced terpolymer is referred to as new reactive polymers (NRPs) in the context of this patent.

The reaction of maleic anhydride with natural rubber is of interest because they impart polarity to the non polar natural rubber. Pure maleic anhydride reacts with natural rubber under different conditions to give different derivatives but, gelation is always a serious problem. Gelation takes place because of formation of chemical structure which is shown in FIG. 1. This structure is very susceptible to crosslink.

Modification of maleic anhydride according to our present invention; prevents formation of gel during the reaction of maleic anhydride with natural rubber. There are some studies about the reaction of maleic anhydride and benzoyl peroxide when amount of benzoyl peroxide is low (0.1-0.5 weight percent of maleic anhydride). Braun and co-workers (Braun. D., Aziz El Sayed. I. A., Pomakis. J., *Makromol. Chem.*, 124, 249 (1969) claimed that the free radical polymerization of maleic anhydride (MA) proceeds with carbon dioxide cleavage. He studied the proton magnetic resonance spectrum of a benzoyl peroxide initiated polymer, concluded that the polymer does not have the expected poly (maleic anhydride) (PMA) structure; he claimed that it consists mainly of cyclopentanone repeating units (FIG. 2). However, Bacskai (Bacskai. R., Journal of Polymer Science: Polymer Chemistry Edition., 14., 1797-1807 (1976)) reported that products of the reaction between benzoyl peroxide and maleic anhydride are not rearranged poly maleic anhydride (FIG. 3).

Both of them above references used low concentration of benzoyl peroxide. There are no reports about the reaction of maleic anhydride with high concentration of benzoyl peroxide. In our present invention; amounts of benzoyl peroxide is very high (fifty weight percent of maleic anhydride or more). It is very hard to identify the nature of the products clearly and it is not the main aim of this invention. The most important thing is that resulting product is able to form complex with styrene, interacts with natural rubber (FIG. 4) and also forms particles in nano size inside of natural rubber. The transition electron microscopy (TEM) study of novel polymer (made from natural rubber) shows the existing of nanoparticles inside the natural rubber (FIG. 5). The particles as small as one nanometer is clearly observed inside the natural rubber (FIG. 5). This new derivative of natural rubber has unique properties; it melts while its thermal stability is the same as that of pure natural rubber, has almost the same glass transition temperature ($T_g$) as that of pure natural rubber, soluble in toluene, precipitate in alcohol, they are compatible with bitumen, easily be dissolved in bitumen (mixing at 150° C. for 30 minutes is enough) and they react with some functional groups which are present in bitumen. Carboxyl group in the modified maleic anhydride is responsible for the reaction with bitumen. Actually it can be claimed that NRPs act like elvaloy (RET) polymers but at the same time has noticeable mechanical strength or it is possible to be claimed that NRPs are similar to TPE polymer but at the same time has the ability to react chemically with bitumen because of carboxyl group present in modified maleic anhydride. The carboxyl group is responsible for the chemical reaction and compatibility between bitumen and NRPs. There are no further problems regarding to maintaining compatibility during storage and uses, since the chemical reaction occurs and also because of presence of nanoparticles of new styrene-modified maleic anhydride copolymer inside the rubber. Actually, it is supposed that such great and excellent changes in properties of natural rubber can only be due to formation of nanoparticles in-situ of natural rubber (FIG. 5). In fact, the presence of nanoparticles which are disperses through the natural rubber prevent settling and agglomeration of natural rubber in the bitumen. Until now none of the known derivatives of natural rubber show all these properties together.

The presence of nanoparticles inside EPDM cause extra percent of elongation at break which have never been reported (4000%). It melts easier than pure EPDM, also modified EPDM of present invention is able to absorb contaminate from water.

The type of the products which are obtained from the reaction between maleic anhydride and benzoyl peroxide depend on amount of benzoyl peroxide and also on time of the reaction. It seems that for definite amount of benzoyl peroxide, products change from time to time. There is an optimum time for each initiator type and concentration, for example for 50% of benzoyl peroxide (weight percent with respect to maleic anhydride), optimum time is five hours. The optimum time is defined as the time that is sufficient to produce suitable products which are able to form complex with styrene copolymer SMMA, the complex behaves as a single particle and react chemically with natural rubber (FIG. 4) and enter the propagation step as a single particle. Gelation does not take place; because, the structure (FIG. 1) which are susceptible to crosslink is not formed in the present invention. If the time is insufficient, natural rubber will be cross-linked and gelation occurs.

Required amount of MMA depends on the type of X component (s) and on desired end properties. For a single X compound (s), there is a minimum amount of MMA which cause X compound (s) be able to readily dispersed in bitumen and do the necessary chemical interactions. There is also a maximum amount of MMA, beyond that cross linked polymers will be produced. Rolling of pure natural rubber is a key parameter, if modified natural rubber is wanted to be used for bitumen modification. Rolling lowers molecular weight of natural rubber causes better melting of natural rubber in bitumen. Thirty minutes at 50° C. is sufficient for pale creep natural rubber. Great changes in properties of NRPs can be created by using different X compound (s) and changing the weight ratio of components with respect to each others. NRPs may be very rigid, tough or highly elastic. Various new thermoplastic elastomers can also be synthesized by the method of the present invention.

Modification of maleic anhydride requires a free radical generating catalyst. Suitable catalyst in accordance with the process include many know organic peroxides, for example, dilauryl peroxide, ditertiary butyl peroxide, diacetyl peroxide, acetyl benzoyl peroxide, tertiary butyl hydro-peroxide, cumene hydrogen peroxide, etc., may be used as well as other free-radical generating catalysts such as azo compounds illustrated by catalysts such as acetone peroxide which provide free-radical reactivity and stability at high temperatures may be used effectively.

Various maleic anhydride compounds such as methyl maleic anhydride, Phenyl maleic anhydride, di-methyl maleic anhydride and chloromaleic anhydride are particularly contemplated. Maleic anhydride is preferred.

Formation of styrene-modified maleic anhydride complex (SMMA) was done by mixing styrene with MMA for one hour at room temperature. Various vinyl aromatic monomers may be used, especially styrene and vinyl toluene is preferred, but other substituted styrene may be used such as ring-alkylated styrene compounds such as the vinyl xylenes, and p-isopropyl styrene, these being illustrative of $C_1$-$C_4$ alkyl-substituted products. Halogen-substituted styrene may also be used in which up to five of the nuclear hydrogen atoms are replaced by chlorine, fluorine, or other halogen, while the invention is primarily directed to styrene and ring-substituted styrene, other nonethylenically unsaturated compounds having a strong tendency to heteropolymerize with maleic compound, especially maleic anhydride, may be used, such as vinyl alkyl ethers illustrated by vinyl ether and vinyl butyl ether, vinyl acetate, and acrylate and methacrylate ester such as ethyl acrylate and methyl methacrylate, and olefins such as ethylene and propylene.

The reaction between SMMA & X compound(s) was carried out in the presence of a chain transfer agent. Variety of chain transfer agents, for example polyhalide, disulfide compounds and mercaptans can be used. While various mercaptans are known to regulate molecular weight distribution efficiently producing uniform products, mercaptans possess an undesired strong odor which most often remains with the polymerized end product. In order to avoid the odor problem created by short chain mercaptans, larger quantities of less efficient long chain mercaptans such as 3-mercaptopropionic acid or 3-mercaptopropionate are used. Required amount of chain transfer agent depends on the type of X compound (s), temperature of the reaction and total weights of monomers and X compound (s) used.

Example 1

A mixture of 1 gram of maleic anhydride, 0.5 gram of benzoyl peroxide and 100 gram of Toluene were charged to a 250 cc multiple-neck round bottom flask equipped with a stirrer, thermometer, condenser and nitrogen inlet. With constant agitation, the mixture was heated to 120° C. under nitrogen sweeping. The mixture was held at this temperature for five hours. Then it is cooled to room temperature and 20 grams of styrene was added to the flask and the mixing was continued for one hour. At the end, 0.1 gram of 3-mercaptopropionic acid was added and mixed for further one hour at room temperature. This solution is called as "Solution A". While 100 grams of natural rubber (pale creep) which were rolled for 30 minutes at 50° C. was dissolved in 200 grams of toluene at 60° C. in a one liter reactor which was equipped with a mechanical stirrer, thermometer, reflux condenser, addition funnels. The "Solution A" was added over two hours to the reactor and mixed with rubber. The mixture was held at 60° C. for two days after addition. A clear brown polymer solution referred as, "polymer 1" was obtained and the toluene was removed by any desired know methods.

Thermal stability of the novel polymer 1 was evaluated by thermal gravimetry analysis (TGA). As it can be seen from the FIG. 6, it has lost only 10% of its initial weight at 336° C. Differential scanning caloriemetry (DSC) of the novel polymer 1 was studied. Its melting point and glass transition temperature ($T_g$) are 90° C. (FIG. 7) and −60° C. (FIG. 8), respectively.

FIG. 9 illustrates TGA thermogram of the novel polymer 1 & pure natural rubber. Heat stability of the novel polymer 1 is better than pure natural rubber (FIG. 9). While DSC analysis of polymer 1 and natural rubber shows that novel polymer 1 can melts but pure natural rubber can not (FIG. 10, DSC analysis in temperature range 0 to 250° C.). The glass transition temperature of novel polymer 1 is almost the same as pure natural rubber (FIG. 11, DSC analysis in temperature range −100 to +50° C.).

In FIG. 12 depicts the stress-strain curve of novel polymer 1. Stress (MPa) vs strain (%) of the novel polymer, at test speed of 50 mm/min was studied. It has tensile strength of 0.2 MPa and its strain at break point is 635%. The low tensile strength is a key parameter which causes the novel polymer 1 to be dispersed through bitumen easily. Six grams of the novel polymer 1 mixed with 94 grams of Iranian Bitumen 60/70 at 150° C., for one hour, while stirrer speed is 1000 rpm. The most important properties of the pure bitumen 60/70 and bitumen containing 6% novel polymer is compared and shown in table 1.

TABLE 1

The most important properties of pure bitumen and that containing 6% of novel polymer 1.

| Materials | Softening point (° C.) ASTM-D36 | Penetration 25 (° C.) (.1 mm) ASTM-D5 | F.B.P (° C.) IP 80/89 |
|---|---|---|---|
| Iranian Bitumen 60/70 | 58 | 70 | −5 |
| Novel Polymer 1 | 72 | 30 | −13 |

The novel polymer 1 is compatible with bitumen, melts, chemically reacts and disperses in it very well, as it can be seen from FIG. 13.

Example 2

In examples 2, the natural rubber of example 1 is replaced with ethylene-propylene-diene monomer (EPDM). The resulting polymer (referred as polymer 2) can be used for absorption of contaminants like oil from water. It behaves like a smart particle when immersed in a mixture of oil and water. It absorbs oil and remains on the surface of the water. Also they can be used whenever EPDM with low meting point and low tensile strength is required.

The TGA of the resulting polymer 2 shows that it lost only 5% of its weight at 300° C. (FIG. 14) and shows better heat stability compare to the pure EPDM (FIG. 15).

FIG. 16 showing the DSC of the novel polymer 2, in temperature range of zero to 200° C. Novel polymer 2 has melting point of 90° C. (FIG. 16) and FIG. 17 illustrates the DSC of the novel polymer 2, in temperature range of −100 to zero ° C., and its glass transition temperature ($T_g$) is −45.57° C. (FIG. 17).

DSC of the novel polymer 2 with pure EPDM rubber was compared in temperature range of zero to 200° C. and the results is shown in FIG. 18. It can be seen that novel polymer 2 melts easier than pure EPDM.

FIG. 19 shows the results of Stress (MPa) vs strain (%) of the novel polymer 2, at test speed of mm/min. Novel polymer 2 has tensile strength of 0.65 MPa and its strain at break point is 4192% (FIG. 19). It has a very high strain at break point and low tensile strength enabling it to absorb large amount of oil.

The invention claimed is:

1. A method for making a reactive terpolymer comprising the steps of:
   a) obtaining a predetermined amount of a functionalized maleic anhydride (FMA) with gelation prevention characteristics by heating a predetermined amount of a maleic anhydride with a predetermined amount of a free radical generation catalyst comprising benzoyl peroxide in a toluene solvent at 120° C., for a predetermined amount of time, wherein said predetermined amount of said free radical generation catalyst consists of at least 50% by weight of said predetermined amount of said maleic anhydride;
   b) cooling said predetermined amount of FMA to room temperature level;
   c) mixing said predetermined amount of FMA with a predetermined amount of vinylic monomers wherein said vinylic monomers comprises a styrene to obtain a predetermined amount of styrene-functionalized maleic anhydride (SFMA);

d) mixing said predetermined amount of SFMA with a predetermined amount of a transfer agent, wherein said transfer agent comprises a 3-mercaptopropionic acid, to obtain a first solution;

e) adding said first solution to a second solution wherein said second solution is selected from a group consisting of a predetermined amount of natural rubber, synthetic rubbers, crumb rubber, thermoplastic elastomers (TPE) and a combination thereof, along with a predetermined amount of toluene to obtain a third solution;

f) heating said third solution to obtain said terpolymer, wherein said terpolymer further comprises formation of nano sized polymers of SFMA copolymer that is dispersed throughout said terpolymer.

2. The method as claimed in claim 1, wherein said method further comprises: adding said terpolymer to a predetermined amount of a bitumen with a predefined characteristic, to changed said characteristic of said bitumen; wherein said characteristics includes a mechanical strength and a stability for storage; and said change in said characteristics comprises reducing the mechanical strength and improving stability for storage.

3. The method as claimed in claim 2, wherein said second solution is selected from a group consisting of natural rubber; and wherein said changes in characteristics includes reducing said mechanical strength of said bitumen to a tensile strength of 0.2 MPa to cause said terpolymer to be dispersed through the bitumen easily.

4. A method as claimed in claim 1, wherein said method further comprises: adding said polymer to a predetermined amount of water to absorb said predetermined of water in said polymer.

5. A method as claimed in claim 1, wherein said predetermined amount of a functionalized maleic anhydride (FMA), further comprises: fillers, organic oxide, inorganic oxide, sulfur, $TiO_2$, $ZnO$, clay and nano clay.

* * * * *